United States Patent
Rudolf et al.

(10) Patent No.: US 12,408,593 B2
(45) Date of Patent: Sep. 9, 2025

(54) CUTTING TOOL

(71) Applicant: HUSQVARNA AB, Huskvarna (SE)

(72) Inventors: Peter Rudolf, Senden (DE); Martin Rauch, Stuttgart (DE)

(73) Assignee: HUSQVARNA AB, Huskvarna (SE)

( * ) Notice: Subject to any disclaimer, the term of this patent is extended or adjusted under 35 U.S.C. 154(b) by 11 days.

(21) Appl. No.: 17/795,744

(22) PCT Filed: Nov. 26, 2020

(86) PCT No.: PCT/EP2020/083460
§ 371 (c)(1),
(2) Date: Jul. 27, 2022

(87) PCT Pub. No.: WO2021/151547
PCT Pub. Date: Aug. 5, 2021

(65) Prior Publication Data
US 2023/0089563 A1 Mar. 23, 2023

(30) Foreign Application Priority Data

Jan. 29, 2020 (EP) .................................... 20154314

(51) Int. Cl.
*A01G 3/037* (2006.01)
*B26B 15/00* (2006.01)

(52) U.S. Cl.
CPC .............. *A01G 3/037* (2013.01); *B26B 15/00* (2013.01)

(58) Field of Classification Search
CPC .......... B26B 15/00; A01G 3/037; A01G 3/033
(Continued)

(56) References Cited

U.S. PATENT DOCUMENTS 1,587,718 A * 6/1926 Gentile .................. B26B 13/26
30/247
1,806,555 A * 5/1931 Gonsett .................. B26B 15/00
56/294
(Continued)

FOREIGN PATENT DOCUMENTS

CN          207630076 U      7/2018
CN          207858895 U      9/2018
(Continued)

OTHER PUBLICATIONS

DE-20205106-U1 English translation; Jun. 27, 2002 DE; Meier, Johann A01G3/037.*
(Continued)

*Primary Examiner* — Laura M Lee
(74) *Attorney, Agent, or Firm* — Burr & Forman

(57) ABSTRACT

A cutting tool (100) includes a top blade (102) and a bottom blade (104). The bottom blade (104) is pivotally coupled to the top blade (102). The top blade (102) and the bottom blade (104) together perform a cutting action on an object place between them. A first handle (108) is operatively coupled with the top blade (102). The first handle (108) defines a front portion (109) and a back portion (111). A second handle (110) is operatively coupled with the bottom blade (104). The cutting tool (100) is characterized in that in closed position of the cutting tool (100), at least a part of the second handle (110) at least partially encloses the back portion (111) of the first handle (108).

13 Claims, 6 Drawing Sheets

(58) Field of Classification Search
USPC .................................................. 30/228, 194
See application file for complete search history.

(56) References Cited

U.S. PATENT DOCUMENTS

| | | | | |
|---|---|---|---|---|
| 3,350,780 | A * | 11/1967 | Artru | A01G 3/033 |
| | | | | 81/358 |
| 5,353,504 | A | 10/1994 | Pai | |
| 5,685,080 | A * | 11/1997 | Amano | B27B 17/08 |
| | | | | 30/DIG. 1 |
| 5,735,353 | A * | 4/1998 | Undin | B25B 7/12 |
| | | | | 81/367 |
| 7,441,337 | B2 * | 10/2008 | Linden | A01G 3/0251 |
| | | | | 30/239 |
| 8,434,234 | B2 * | 5/2013 | Chen | A01G 3/037 |
| | | | | 30/247 |
| 8,893,390 | B2 * | 11/2014 | Nie | B26B 15/00 |
| | | | | 30/247 |
| 9,955,627 | B2 * | 5/2018 | Nakano | A01G 3/062 |
| 10,406,718 | B2 * | 9/2019 | Arthur | B24B 55/052 |
| 2002/0116824 | A1 * | 8/2002 | Herrmann | B26B 15/00 |
| | | | | 30/260 |
| 2005/0160606 | A1 * | 7/2005 | Yao | B26B 15/00 |
| | | | | 30/228 |
| 2008/0256805 | A1 * | 10/2008 | Maddison | A01G 3/08 |
| | | | | 30/295 |
| 2009/0151170 | A1 | 6/2009 | Lee et al. | |
| 2011/0016730 | A1 | 1/2011 | Wu | |
| 2012/0011729 | A1 * | 1/2012 | Kim | A01G 3/037 |
| | | | | 30/228 |
| 2016/0021819 | A1 * | 1/2016 | Nakano | A01G 3/062 |
| | | | | 30/276 |
| 2018/0325035 | A1 * | 11/2018 | Chung | F16H 3/66 |
| 2020/0346335 | A1 * | 11/2020 | Yang | B25F 3/00 |

FOREIGN PATENT DOCUMENTS

| | | | | |
|---|---|---|---|---|
| DE | 20205106 U1 * | 6/2002 | | A01G 3/037 |
| DE | 102016211974 A1 | 1/2018 | | |
| EP | 1574125 A1 * | 9/2005 | | A01G 3/033 |
| EP | 3081075 A1 * | 10/2016 | | A01G 3/021 |
| FR | 2462094 A * | 3/1981 | | A01G 3/033 |
| JP | 2008067630 A * | 3/2008 | | |
| WO | 20180205126 A1 | 11/2018 | | |

OTHER PUBLICATIONS

International Search Report and Written Opinion of International Application No. PCT/EP2020/083460 mailed Jan. 29, 2021, all pages cited in its entirety.

* cited by examiner

CUTTING TOOL

TECHNICAL FIELD

The present disclosure relates to a cutting tool. More specifically, the present disclosure relates to the cutting tool which allows easy and ergonomic handling for common users.

BACKGROUND

Cutting tools such as secateurs, loppers, rakes, pliers are used for performing cutting action using one or more blades. Put simply, such tools provide increased mechanical assistance and ease of operation to a common user to conveniently perform operations such as with branches of varying dimensions. But application of conventional cutting tools may involve hardships due to the need for a user to frequently apply cutting force. Further, the cutting tools provide benefits such as trapping bypass cutting or simply "bypass" allows pruning/cutting by the cutting tools while holding an object (i.e. branch) with one of the cutting edges.

However, there may be many instances where working with the cutting tools become inconvenient for a user. For instance, the cutting tools may be bulky or ergonomically less suitable which makes their application inconvenient for the common user.

An example of a cutting tool is provided in German patent application 10,2016,211,974 (hereinafter referred to as '974 reference). The '974 reference provides a cutting tool. The cutting tool includes a first and a second cutting element which can be moved relative to one another. The cutting tool further includes a first and a second gripping element which can be moved relative to one another. The cutting tool includes a drive unit which in at least one operating state is provided to at least support a movement of the second cutting element relative to the first cutting element via a drive force transmission element. The drive force transmission element has a gear unit having a self-switching coupling unit. It is proposed that the drive unit, the gear unit, the coupling unit and the drive element of the drive force transmission element are arranged in this order, on or in the first handle member. The battery supplying power to the motor is located in the second handle member and is transmitted via a wire. The resultant design results in a bulky and ergonomically inconvenient cutting tool.

Thus, there is a need of an improved cutting tool with an ergonomic and compact profile which allows ease of operation for different needs of users.

SUMMARY

In view of the above, it is an objective of the present invention to solve or at least reduce the drawbacks discussed above. The objective is at least partially achieved by a cutting tool. A cutting tool includes a top blade and a bottom blade. The bottom blade is pivotally coupled to the top blade. Further, the top blade and the bottom blade together perform a cutting action on an object placed between them. The cutting tool further includes a first handle and a second handle. The first handle is operatively coupled with the top blade. Moreover, the first handle defines a front portion and a back portion. The second handle is operatively coupled with the bottom blade. The cutting tool is characterized in that, in closed position of the cutting tool, at least a part of the second handle at least partially encloses the back portion of the first handle. Thus, the present disclosure provides a simple, compact and user-friendly cutting tool which allows ease of handling for common users, by moving some of the parts of its electric drive unit into a section of the handle that is normally not touched by the user when operating the cutting tool. Advantageously the partly enclosure of the back of the first handle by a part of the second handle in closed position also protects the cutting tool from obstacles unintentionally moving into the space between the two handles. This in particular helps when maneuvering in bushes and trees. Further the movement of some of the parts of its electric drive unit into a section of the handle that is normally not touched by the user allows the placement of the users hand nearby the pivot point of blades and handles. By this even users with small hands can easily operate the cutting tool.

According to an embodiment of the present invention, a battery of a drive unit is housed within the second handle. This helps in reducing the dimensions of the first handle so that the first handle remains even more partially enclosed within the second handle.

According to an embodiment of the present invention, the drive unit includes a motor, a gearbox, a drum, a printed circuit board assembly (PCBA) and a battery to selectively provide the supplemental motor force. This supplemental motor force by the drive unit provides the mechanical advantage to assist cutting action by the blades. Additionally, the drive unit may be enclosed within the second handle. Thus, the size of the first handle can be further reduced.

According to an embodiment of the present invention, the drive unit is operatively coupled to at least one of the top blade and the bottom blade. Further, the drive unit is configured to selectively provide a supplemental motor force to assist a movement of at least one of the top blade and the bottom blade to perform the cutting action. This makes the cutting tool of the present disclosure applicable and suitable as per varying requirement (i.e. cutting assistance or mechanical advantage) of different users.

According to an embodiment of the present invention, the cutting tool includes a switch to activate or deactivate the drive unit. This allows to have a safe and convenient operation of the cutting tool with the provision of the switch.

According to an embodiment of the present invention, the second handle may comprise a recess in which the first handle is arrangeable or arranged in closed position of the cutting tool. Additionally, a wall of the second handle may form the recess and may have a contour, preferably an arc-shaped or curved contour, corresponding to a contour, preferably an arc-shaped or curved contour, of the first handle such that the corresponding contours of first and second handle may be arrangeable or arranged closely adjacent to each other in a closed position of the cutting tool. In such way, the first handle and the second handle are enabled to be located very close to each other in a closed state of the cutting tool. Further, the handles can be formed ergonomically.

According to an embodiment of the present invention, the second handle may define a longitudinal axis, in particular corresponding to an axis of a drive shaft of the drive unit, wherein the motor and/or the gear box and/or the drum and/or a bearing for supporting the drive shaft may be arranged consecutively relative to the longitudinal axis and wherein the battery and/or the printed circuit board assembly may be arranged laterally offset to the motor and/or the gear box and/or the drum and/or a bearing for supporting the drive shaft relative to the longitudinal axis. Such an arrangement of the components of the drive unit within the handle enables a very balanced tool, since the masses of the components are distributed in an optimized way.

According to an embodiment of the present invention, at least the second handle may comprise two half-shells forming a cavity in an assembled state of the second handle, in particular wherein the drive unit may be arrangeable or arranged in the cavity, wherein at least one of the half-shells may comprise one or two or more reinforcement structures, in particular reinforcement and support ribs or reinforcement and support walls, which are configured to support components of the drive unit arrangeable or arranged in the cavity and to reinforce the outer handle wall of the second handle against deformation caused during cutting action. In such way, assembling of the drive unit within the handle is simplified. The handle as defining a hollowing structure is stiffened and made resistant against mechanical deformation. At the same time, advantageous support for the distinct components of the drive unit is provided.

According to an embodiment of the present invention, a first half-shell may comprise a plurality of connection domes, in particular thread domes, which structurally reinforce the outer wall of the first handle, in particular wherein four connection domes are arranged to define a quadrilateral plane in which at least one component of the drive unit, in particular a sub-unit including a gear box and/or a drum or a sub-unit including a motor and/or a battery and/or a printed circuit board assembly, may be arranged. Thus, an advantageous reinforcement structure is created by integrating the thread domes that are used for screw connections to assembly the half-shells of the handle to each other.

According to an embodiment of the present invention, the second handle comprises at least one end portion and at least one central portion, wherein the end portion defines a first width $W_1$ and the central portion defines a second width $W_2$ being different from the first width $W_1$, in particular wherein $W_1$ is at least $1.4 \times W_2$ or at least $1.6 \times W_2$ or at least $1.8 \times W_2$ or at least $2 \times W_2$. The foregoing dimensions have been shown to enable a balanced tool with good ergonomic properties.

According to an embodiment of the present invention, the first handle may define a third width $W_3$, wherein the difference of first width $W_1$ minus the second width $W_2$ may substantially equal the third width $W_3$. Such a cutting tool comprises a first handle that forms a compact and closed unit with the second handle in a closed state of the cutting tool.

According to an embodiment of the present invention, first and/or second and/or third width may lie within the same plane, in particular wherein the plane corresponds to the plane in which the closing movement of the first and second handle and/or of the top and bottom blade occurs. Thus, compactness can be increased and am approximately monolithic outer appearance of the cutting tool can be achieved.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

Figure 1:
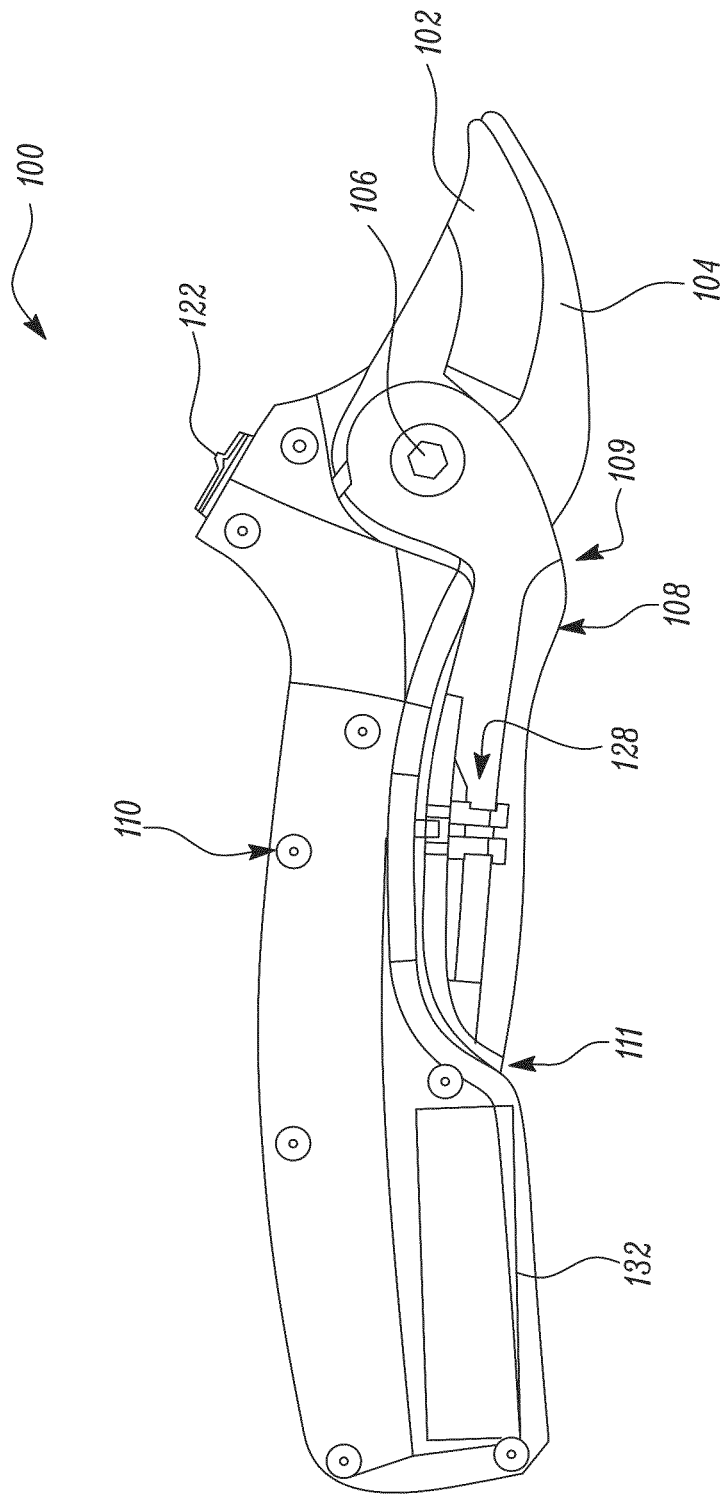
FIG. 1 shows a perspective view of a cutting tool, in accordance with an aspect of the present disclosure.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention may be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

FIG. 1 illustrates a cutting tool 100. The cutting tool 100 of the present disclosure is illustrated as secateurs, however, the present disclosure may be readily applied to any cutting tool 100 such as, but not limited to, a lopper, shears, scissors etc. with one, two or more cutting edges. The cutting tool 100 includes one or more blades i.e. a top blade 102 and a bottom blade 104. Preferably the top blade 102 is a replaceable blade. The cutting tool 100 further includes a nut 106. Preferably this nut 106 is removable. The nut 106 is provided at the pivoted position of the top blade 102 and the bottom blade 104.

In some embodiments, the removable nut 106 may be any one or more of a coupling nut, a flange nut, a hex nut, a lock nut, a slotted nut, a square nut, a wheel nut and the like.

The bottom blade 104 is pivotally coupled to the top blade 102. The top blade 102 and the bottom blade 104 together perform a cutting action on an object (generally a branch) placed between them. In one embodiment the cutting tool 100 further includes a lid 132 That allows an easy replacement of the battery. Preferably the cutting tool is using a replaceable battery or even can use different ones out of a set of replaceable batteries.

As illustrated in FIG. 1, the cutting tool 100 includes one or more handles i.e. a first handle 108 and a second handle 110. The first handle 108 is operatively coupled with the top blade 102. The first handle 108 defines a front portion 109 and a back portion 111. The second handle 110 is operatively coupled with the bottom blade 104. In closed position of the cutting tool 100, at least a part of the second handle 110 at least partially encloses the back portion 111 of the first handle 108. This improves ergonomic profile of the combination of the first handle 108, and the second handle 110, particularly in the closed position of the cutting tool 100.

In some embodiments, any or both of the top blade 102 and the bottom blade 104 may be one or more of a clip point blade, a drop point blade, a gut hook blade, a hawkbell blade, a needle point blade, a straight back blade, a sheepsfoot blade, a spear point blade or any other blade as used or known in the art.

In some embodiment, the top blade 102 and the bottom blade 104 may be made of aluminum or any other material as used or known in the art. Choice of the material for any of the top blade 102 and the bottom blade 104 will generally depend upon factors such as life, application, weight or other parameters related to the cutting tool 100. However, the present disclosure is not to be limited by the type of material, type, or specification of the top blade 102 and the bottom blade 104 in any manner.

During implementation, at least one of the top blade 102 and the bottom blade 104 may be a fixed blade while the other performs desired cutting action. Alternately or additionally, both the top blade 102 and the bottom blade 104 may be movable during the cutting action.

In some embodiments, the coupling of the one or more blades i.e. the top blade 102 and the bottom blade 104 to its respective handles 108 and 110 may be done by gluing, tying, screwing and the like.

Figure 2:
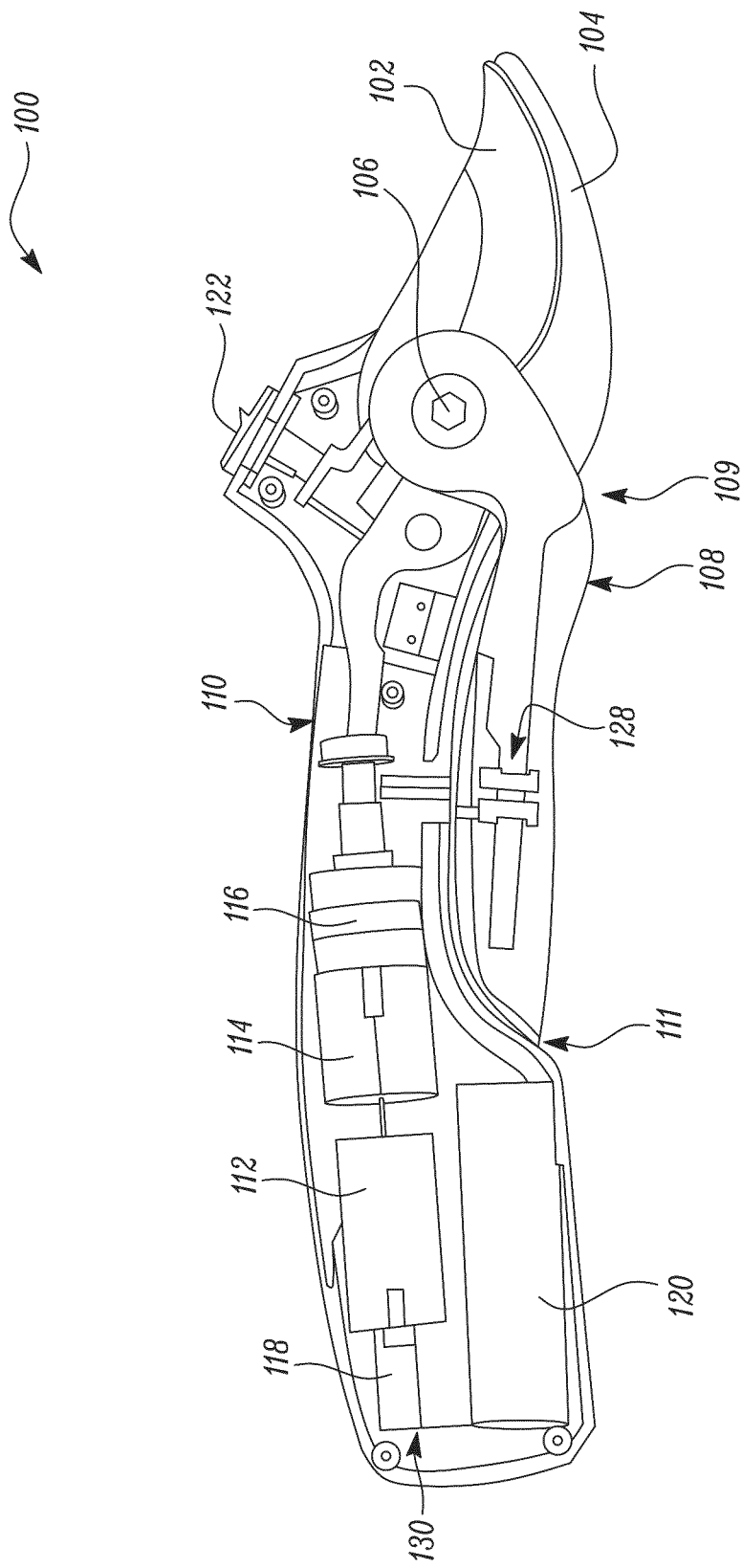
FIG. 2 shows a perspective view of a drive unit within the cutting tool, in accordance with an aspect of the present disclosure.

FIG. 2 illustrates the cutting tool 100 which includes a drive unit 130. The drive unit 130 includes a motor 112 and a gearbox 114. The drive unit 130 further includes a drum 116 comprising a clutch, a retraction spring and a winch. Moreover, the drive unit 130 includes a battery 120 a printed circuit board assembly (PCBA) 118. In the depicted embodiment the battery 120 is covered by the lid 132. The lid 132 may be assembled or disassembled using any arrangement such as, but not limited to, sliding connection, snap-fit connection or push-fit connection to change the battery 120. The drive unit 130 may be operatively coupled to at least one of the top blade 102 and the bottom blade 104. The drive unit 130 is configured to selectively provide a supplemental motor force to assist a movement of at least one of the top blade 102 and the bottom blade 104 to perform the cutting action. In the illustrated embodiments, the drive unit 130 is housed in the second handle 110. Further, the battery 120 of the drive unit 130 is housed within the second handle 110. This helps in reducing the dimensions of the first handle 108, particularly the combined profile of the second handle 110 enclosing the first handle 108 becomes more ergonomic and easier to handle for common users.

In some embodiments, the battery 120 may be a primary battery, or a secondary battery. For example, the battery 120 may be one or more of a lithium-ion, a nickel cadmium, a nickel-metal hydride, lead-acid.

In a preferred embodiment, all components of the drive unit 130 are housed in a single handle i.e. the second handle 110 as best illustrated in FIG. 2 with the cutting tool being in closed status. This helps in reducing the thickness, dimensions, ergonomic profile or spatial footprint of the first handle 108. This even allows the combined profile of the second handle 110, and the first handle 108 to be looked at as one part, particularly during closed state of the first handle 108, when at least a part of the second handle 110 at least partially encloses the back portion 111 of the first handle 108. This advantageous ergonomic profile can be seen with the side view of the cutting tool 100 of FIG. 2. By this it also becomes possible to realize the first handle 108 as a slim bottom handle that allows the operation of the cutting tool even with small hands.

In some embodiments, outer boundary lines (not shown) of both the first handle 108 and the second handle 110 may be parallel to each other. Alternately or additionally, the outer boundary lines of the one or more of handles i.e. the first handle 108 and the second handle 110 may be non-parallel or non-aligned with respect to each other.

In an embodiment, the cutting tool 100 includes a slider or trigger to activate or deactivate the drive unit 130. In the depicted embodiment this slider or trigger is realized in top of the cutting tool 100 as slider or trigger 122, alternatively it as well could be realized as a slider or trigger. On engaging, moving or pressing the slider or trigger 122 the drive unit 130 gets switched on and off and thus the cutting tool 100 becomes convenient and safe to handle by common users. The drive unit 130 may be deactivated for instances which may require to save/extend battery life or allow uninterrupted operation of the power-assisted cutting tool 100, such as for low battery conditions. In such instances of the deactivated drive unit 130, it could be possible that the motor 112 will remain in a disengaged/OFF state leading to a purely user-based cutting action by the cutting tool 100, without any supplemental motor force. In one embodiment the slider or trigger 122 might also look the cutting tool 100 in a closed status.

In some embodiments, the slider or trigger 122 may be a button, a knob, a single pole single throw switch, a single pole double throw switch, a double pole single throw switch, a double pole double throw switch, a push-button switch, a toggle switch, a limit switch, a float switch, and the like. Alternately or additionally, a button, a knob, or any other switching means as used or known in the relevant art may be present in place of or additionally to the slider or trigger 122.

Figure 3:
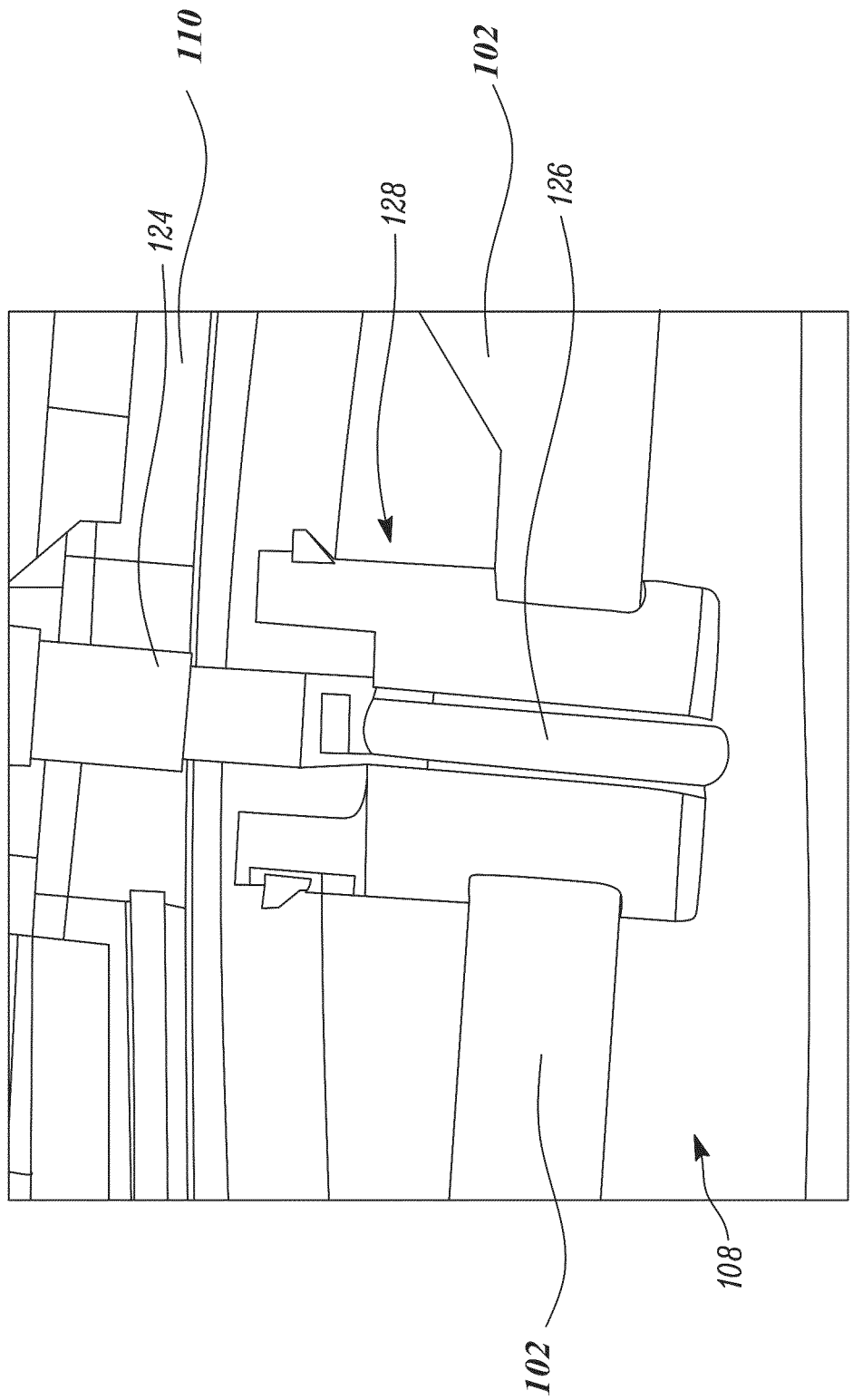
FIG. 3 shows a perspective view of an adapter of the cutting tool, in accordance with an aspect of the present disclosure.
Figure 4:
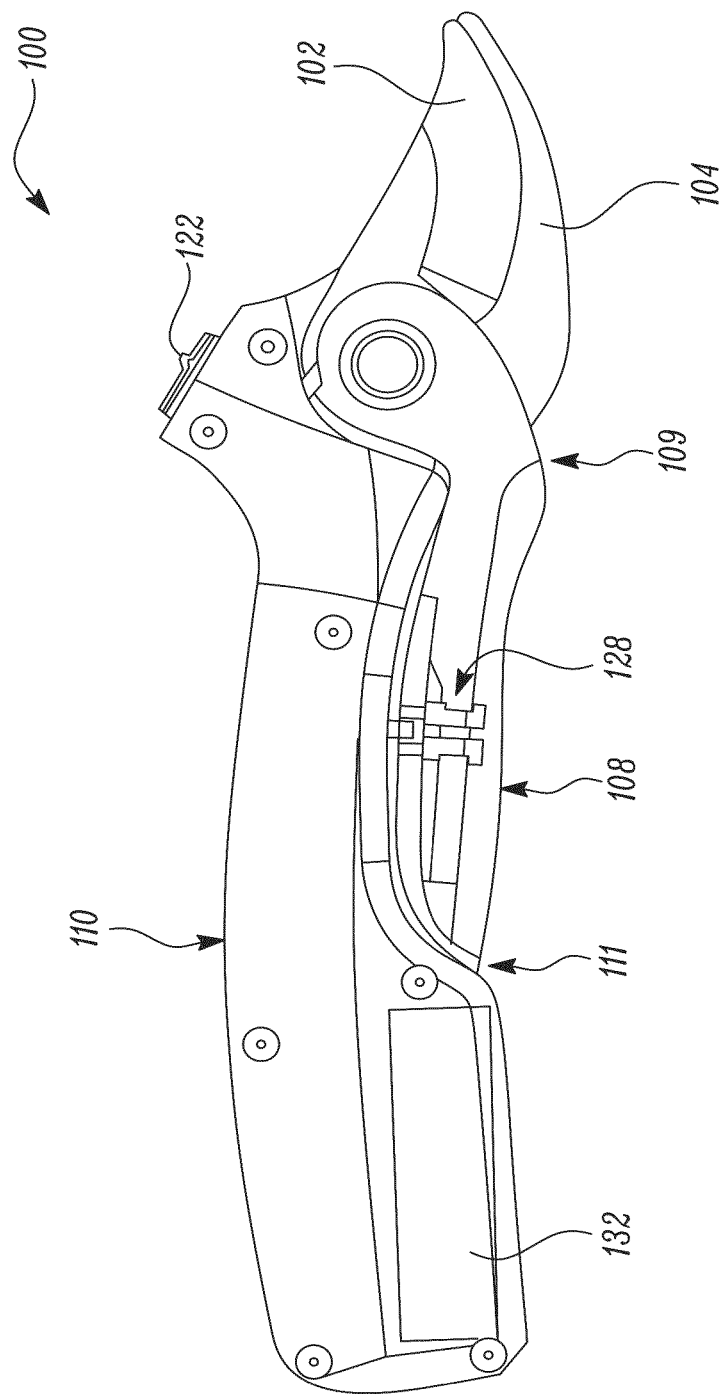
FIG. 4 shows a perspective view of the cutting tool of FIG. 1 after disassembly of a removable nut, in accordance with an aspect of the present disclosure.

FIG. 3 illustrates details with the first handle 108 (shown in the bottom of the drawing) and the second handle 110 (shown on the top of the drawing) of the cutting tool 100 in a closed position. The cutting tool 100 having a spring 124. The cutting tool 100 further includes a rope 126 transmitting the force from the drive unit 130 inside the second handle 110 into the first handle 108 and an adapter 128 inside of the first handle 108. The adapter 128 finds application for pre-fixing the spring 124 and the rope 126 with the first handle 110, without any direct engagement or contact of the spring 124 and the rope 126 with the first handle 110, as best illustrated in FIG. 4. The top blade 102 passes through the adapter 128. The piercing of the top blade 102 through the adapter 128 helps in securing or locking of the top blade 102 within the adapter 128, and/or the bottom handle 110 as per the requirement.

During implementation, a connection of the adapter 128 with the top blade 102 may be achieved by pushing, sliding, and piercing the top blade 102 through the adapter 128. The adapter 128 may be made up of one or more of a material like plastic, rubber, polymers, glass and the like. The adapter 128 allows smooth assembly or disassembly during movement of the top blade 102 (through the adapter 128) by simple pulling action on the top blade 102, after removal of the removal nut 106 as illustrated in FIG. 4.

FIG. 4 illustrates the cutting tool 100 post disassembly of the removable nut 106. This sets up the cutting tool 100 for removal or disassembly of the top blade 102 from the cutting tool 100. The removable nut 106 may be disassembled by use of hand tools or by any other way convenient for the common user. Then, the disassembled top blade 102 allows its substitution with another top blade 102 (not shown), which may have a sharper edge or any other desired feature. During implementation, the top blade 102 may be substituted with another top blade 102. The substituted blade i.e. another top blade 102, for the top blade 102, may have different design, profile etc. with same basic structure which may allow it to desirably engage with the adapter 128.

Figure 5:
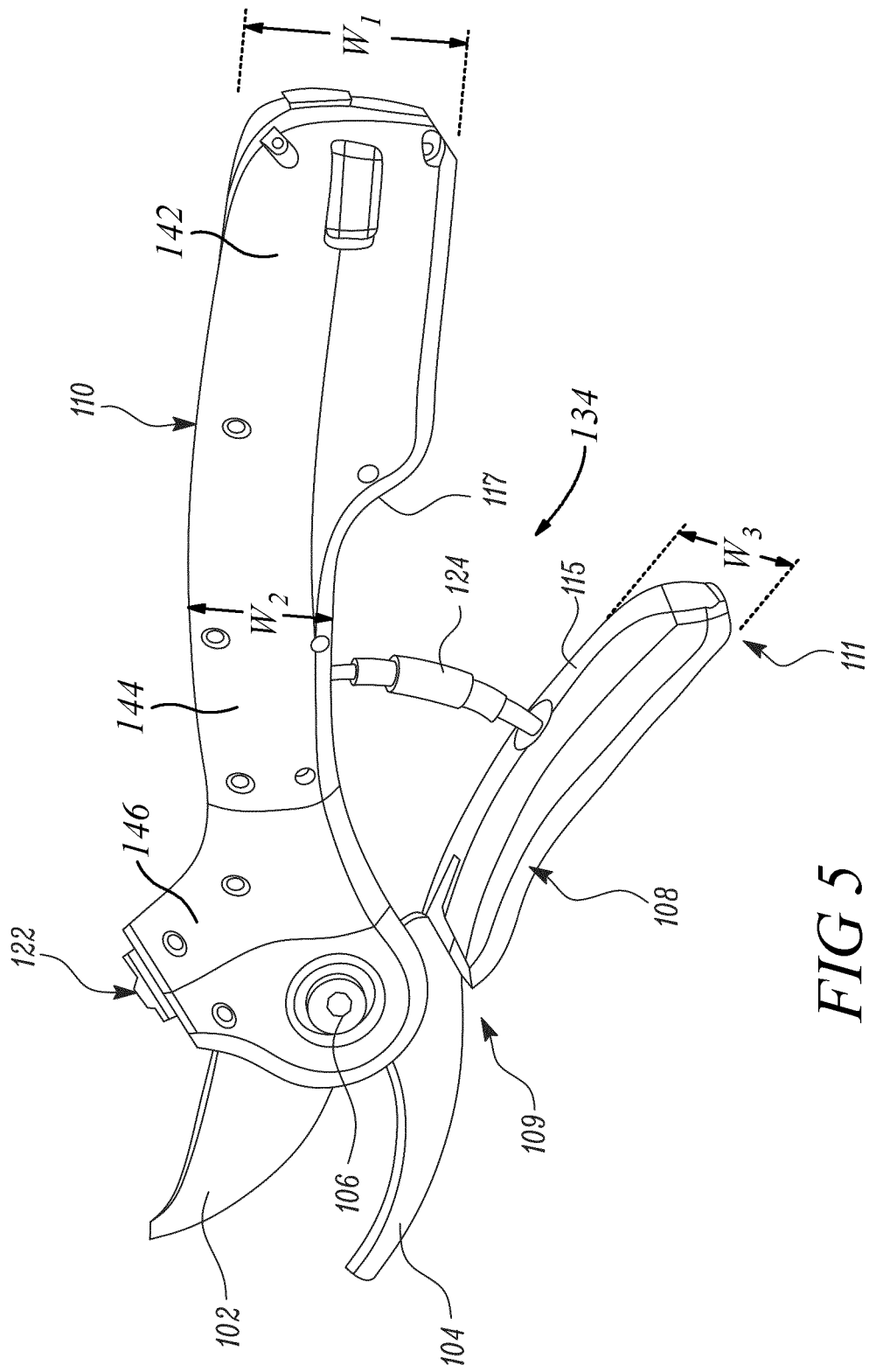
FIG. 5 shows a perspective view of the cutting tool having a first handle which is not enclosed by a second handle of the cutting tool, in accordance with another aspect of the present disclosure.

FIG. 5 illustrates the cutting tool 100 with the first handle 108 disengaged and not enclosed by the second handle 110. The first handle 108 and the second handle 110 have one or more inner sides 115, 117 respectively. In some embodiments, the diameter of both the first handle 108, and the second handle 110 may be advantageously rounded. Any or both of the first handle 108, and the second handle 110 may have a soft grip surface to increase the ease of use or to avoid slipping during application. Advantageously, an undesirable crushing, in particular a pinching of a skin of an operator's hand, trapping of the operator's hand between the first handle 108 and the second handle 110, and the like may be avoided by the elastic, rounded design of the one or more inner sides 115, 117 of both the first handle 108 and the second handle 110.

Further, as illustrated in FIG. 5, a recess 134 is formed by the second handle 110. The form of the recess 134 corresponds with the form of the first handle 108 such that the first handle 108 can be arranged within the recess closely to the second handle 110. The recess 134 and the first handle 108 comprise corresponding contours that are arc-shaped or curved. The recess is delimited by an end portion 142 and a central portion 144 of the second handle 110, wherein the end portion has a width $W_1$ being substantially larger that a width $W_2$ of the central portion, such that the first handle 108, having a width $W_3$ fits within the recess 134 to such an extent that the first handle 108 forms a closed outer contour with the second handle 110 and does not project beyond the contour of the second handle 110 at least within a plane defined by the plane drawn up by the first handle 108, the second handle 110 and a pivot point, e.g. defined by the nut 106.

Figure 6:
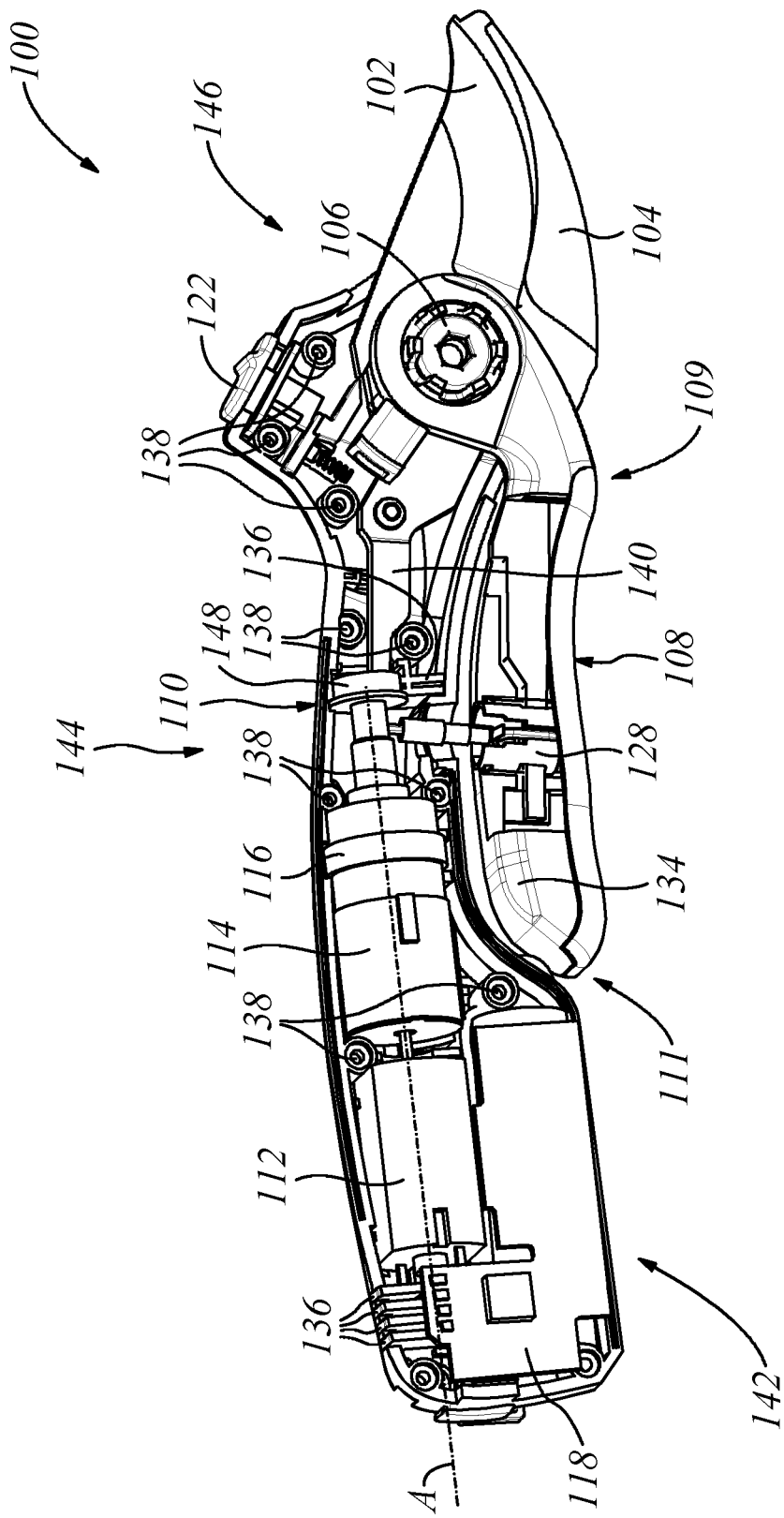
FIG. 6 shows a perspective view of a drive unit within the cutting tool, similar to FIG. 2 with some more details.

FIG. 6 illustrates the cutting tool 100 in a closed state. The first handle 108 is accommodated within the recess 134. The drive unit 130 is arranged completely within a cavity formed by a first half-shell of the second handle 110. A drive shaft (not referenced) of the drive unit 130 defines an axis A. Motor 112, gear box 114, drum 116 and a bearing 148 for supporting the drive shaft are arranged consecutively or in other words in a row. In this specific embodiment, the motor shaft and the gear shaft coupled to the drive shaft extend within one axis A, however, the skilled person may appreciate that there may be further possibilities of arrangement. The printed circuit board assembly PCBA and the battery 120 are not arranged within a row with the other components of the drive unit 130, but are laterally offset to them. In particular, the longitudinal axis of the printed circuit board assembly PCBA and the battery 120 is offset laterally to the axis A and may be arranged parallel or non-parallel thereto.

Furthermore, the second handle 108 comprises two shells forming a hollow cavity for accommodation of the drive unit 130, wherein one half-shell is removed in the view of FIG. 6. The half-shell that is still visible comprises thread domes 138 for receiving screws for connecting both half-shells to each other. It shall be appreciated that the thread domes 138 further increase the resistance of the second handle 110 against mechanical deformation, by the way of their form as support posts. This effect is further increased by arranging the thread domes 138 at specific positions. Four thread domes 134 are arranged to define a quadrilateral plane in which a sub-unit including a gear box 114 and a drum 116 or a sub-unit including a motor 112, a battery 120 and a printed circuit board assembly PCBA is arranged. Additionally or alternatively, it is possible that a shaft 140 of the bottom blade 104 may be coupled to the second handle 110 in a region close to thread domes 134, e.g. in such way that the shaft 140 protrudes in the direction of the axis A, wherein, e.g. two thread domes 134 form a support and/or fixation and/or a coupling recess for the shaft 140. Additionally, the second handle 110 may comprise reinforcement structures 136 such as reinforcement and support ribs or reinforcement and support walls in order to support the components of the drive unit 130 fixedly within the cavity of the second handle 110 and to provide the second handle 110 with structural reinforcements to resist mechanical deformations.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Cutting Tool
102 Top Blade
104 Bottom Blade
106 Removable Nut
108 First handle
109 Front Portion
110 Second handle
111 Back Portion
112 Motor
114 Gear Box
115 Inner Side
116 Drum
117 Inner Side
118 Printed Circuit Board Assembly (PCBA)
120 Battery
122 Slider or Trigger
124 Spring
126 Rope
128 Adapter
130 Drive unit
132 Lid
134 Recess
136 Reinforcement structures
138 Thread domes
140 Shaft
142 End portion
144 Central portion
146 Front portion
148 Bearing
A Axis of drive shaft
$W_1$ First width
$W_2$ Second width
$W_3$ Third width

The invention claimed is:
1. A cutting tool comprising:
a top blade;
a bottom blade pivotally coupled to the top blade, wherein the top blade and the bottom blade together perform a cutting action on an object placed therebetween;

a first handle operatively coupled with the top blade, wherein the first handle comprises a front portion, a back portion and a first inner side; and a second handle operatively coupled with the bottom blade;

wherein, in a closed position of the cutting tool, at least a part of the second handle at least partially encloses the back portion of the first handle, and wherein the cutting tool further comprises a drive unit and a slider or trigger to activate and deactivate the drive unit, wherein the drive unit is configured to selectively provide a supplementary motor force to assist pivoting the top blade relative to the bottom blade, wherein the slider or trigger is disposed at the second handle and operable by a user of the cutting tool to power on and power off the drive unit and to selectively provide the supplementary motor force via the drive unit, wherein the second handle comprises a recess defined by a second inner side of the second handle, wherein the first inner side and the second inner side are both arcuate and the first handle is conformal with the second handle in the closed position, and wherein the second handle comprises the recess in which the first handle is arrangeable or arranged in the closed position of the cutting tool, wherein a wall of the second handle forming the recess has a contour of an arc-shaped or curved contour, corresponding to a contour of an arc-shaped or curved contour, of the first handle such that the corresponding contours of first and second handle are arrangeable or arranged closely adjacent to each other in the closed position of the cutting tool.

2. The cutting tool of claim 1, wherein a battery of the drive unit is housed within the second handle.

3. The cutting tool of claim 2, wherein the drive unit comprising a motor, a gearbox, a drum, Printed Circuit Board Assembly (PCBA) and the battery to selectively provide the supplementary motor force, wherein the drive unit is enclosed within the second handle.

4. The cutting tool of claim 2, wherein the drive unit is operatively coupled to at least one of the top blade and the bottom blade.

5. The cutting tool of claim 1, wherein at least the second handle comprises two half-shells forming a cavity in an assembled state of the second handle, wherein the drive unit is arrangeable or arranged in the cavity, wherein at least one of the half-shells comprises one or two or more reinforcement structures in a form of reinforcement and support ribs or reinforcement and support walls, which are configured to support components of the drive unit arrangeable or arranged in the cavity and to reinforce the outer handle wall of the second handle against deformation caused during cutting action.

6. The cutting tool of claim 5, wherein a first half-shell comprises a plurality of connection domes including thread domes, which structurally reinforce the outer wall of the second handle, wherein four connection domes are arranged to define a quadrilateral plane in which at least one component of the drive unit comprising a sub-unit including a gear box or a drum or a sub-unit including a motor or a battery or a printed circuit board assembly (PCBA), is arranged.

7. The cutting tool of claim 1, wherein the second handle comprises at least one end portion and at least one central portion, wherein the at least one end portion defines a first width and the at least one central portion defines a second width being different from the first width, wherein the first width is at least 1.4 times the second width.

8. The cutting tool of claim 7, wherein the first handle defines a third width, wherein a difference of the first width minus the second width substantially equals the third width.

9. The cutting tool of claim 8, wherein the first width, the second width or the third width lie within the same plane, wherein the same plane corresponds to a plane in which a closing movement of the first and second handle or of the top and bottom blade occurs.

10. The cutting tool of claim 1, wherein a length of the first handle extending from the front portion to the back portion is between 30% and 70% of a length of the second handle.

11. The cutting tool of claim 1, wherein the first handle is operably coupled to the second handle via an adapter disposed within the first handle, and wherein the adapter is operably coupled to the top blade such that the top blade extends through the adapter within the first handle.

12. A cutting tool comprising:

a top blade;

a bottom blade pivotally coupled to the top blade, wherein the top blade and the bottom blade together perform a cutting action on an object placed therebetween;

a first handle operatively coupled with the top blade, wherein the first handle defines a front portion and a back portion; and a second handle operatively coupled with the bottom blade;

wherein, in a closed position of the cutting tool, at least a part of the second handle at least partially encloses the back portion of the first handle, wherein a drive unit disposed within the second handle comprises a motor, a gearbox, a drum, Printed Circuit Board Assembly (PCBA) and a battery to selectively provide supplemental motor force, wherein the drive unit is enclosed within the second handle, wherein the second handle defines a longitudinal axis corresponding to an axis of a drive shaft of the drive unit, wherein the motor, the gear box, the drum, and a bearing for supporting the drive shaft are all disposed coaxially along the longitudinal axis, wherein the battery or the printed circuit board assembly is arranged laterally offset to the motor or the gear box or the drum or the bearing for supporting the drive shaft relative to the longitudinal axis, and wherein the cutting tool further comprises a slider or trigger to activate and deactivate the drive unit, wherein the drive unit is configured to selectively provide a supplementary motor force to assist a movement of at least one of the top blade and the bottom blade, and wherein the slider or trigger is disposed at the second handle and operable by a user of the cutting tool to power on and power off the drive unit and to selectively provide the supplementary motor force via the drive unit.

13. The cutting tool of claim 12, wherein the first handle is operably coupled to the second handle via an adapter disposed within the first handle, and wherein the adapter is operably coupled to the top blade such that the top blade extends through the adapter within the first handle.

* * * * *